(12) United States Patent
Oster et al.

(10) Patent No.: US 11,978,365 B2
(45) Date of Patent: May 7, 2024

(54) LABELLING MATERIAL

(71) Applicant: PHOENIX CONTACT GmbH & Co. KG, Blomberg (DE)

(72) Inventors: Patrick Oster, Lemgo (DE); Alexander Hofmann, Hameln (DE)

(73) Assignee: PHOENIX CONTACT GmbH & Co. KG, Blomberg (DE)

( * ) Notice: Subject to any disclaimer, the term of this patent is extended or adjusted under 35 U.S.C. 154(b) by 428 days.

(21) Appl. No.: 17/293,866

(22) PCT Filed: Nov. 11, 2019

(86) PCT No.: PCT/EP2019/080880
§ 371 (c)(1),
(2) Date: May 13, 2021

(87) PCT Pub. No.: WO2020/099327
PCT Pub. Date: May 22, 2020

(65) Prior Publication Data
US 2022/0013044 A1    Jan. 13, 2022

(30) Foreign Application Priority Data
Nov. 13, 2018  (BE) .................. 2018/5798

(51) Int. Cl.
*G09F 3/02* (2006.01)
*B32B 3/04* (2006.01)
(Continued)

(52) U.S. Cl.
CPC ............ *G09F 3/02883* (2021.05); *B32B 3/04* (2013.01); *B32B 7/05* (2019.01); *B32B 7/06* (2013.01);
(Continued)

(58) Field of Classification Search
CPC .......... G09F 3/02; G09F 3/10; G09F 3/02883; G09F 2003/0201; G09F 2003/021;
(Continued)

(56) References Cited

U.S. PATENT DOCUMENTS 5,840,143 A * 11/1998 Swanson ................ B42D 25/23
156/289
7,249,902 B2 * 7/2007 Kurashina .......... G06Q 30/0601
400/613.2
(Continued)

FOREIGN PATENT DOCUMENTS

DE          19749632        3/1999
DE         102015115176     3/2017
(Continued)

OTHER PUBLICATIONS

PCT Search Report for corresponding PCT International Application No. PCT/EP2019/080880 dated Nov. 13, 2018, 5 pages.
(Continued)

*Primary Examiner* — Cassandra Davis
(74) *Attorney, Agent, or Firm* — Lee & Hayes, P.C.

(57) ABSTRACT

Labeling material includes a labeling region to be printed using a printing device and/or for handwritten labeling. The labeling material includes a carrier layer that is at least partially transparent and can be folded over onto the labeling region to cover or seal the labeling region and can be bonded thereto in portions or over the entire surface. One or more adhesive regions, such as an adhesive layer, adhesive dots, adhesive strips, etc., bond the at least partially transparent carrier layer to the labeling region in portions or over the entire surface. The adhesive region and the labeling region are arranged on the same side of the at least partially transparent carrier layer.

13 Claims, 5 Drawing Sheets

(51) Int. Cl.
  *B32B 7/05* (2019.01)
  *B32B 7/06* (2019.01)
  *B32B 7/12* (2006.01)
  *B32B 15/04* (2006.01)
  *G09F 3/10* (2006.01)

(52) U.S. Cl.
  CPC ............... *B32B 7/12* (2013.01); *B32B 15/04* (2013.01); *G09F 3/10* (2013.01); *B32B 2262/103* (2013.01); *B32B 2264/105* (2013.01); *B32B 2307/75* (2013.01); *B32B 2405/00* (2013.01); *B32B 2519/00* (2013.01); *G09F 2003/0201* (2013.01); *G09F 2003/0222* (2013.01); *G09F 2003/0257* (2013.01)

(58) Field of Classification Search
  CPC ..... G09F 2003/0229; G09F 2003/0257; G09F 2003/0222; Y10T 428/1471; B32B 3/04; B32B 7/05; B32B 7/12; B32B 2307/75; B32B 2405/00; B32B 2519/00
  See application file for complete search history.

(56) References Cited

U.S. PATENT DOCUMENTS

| | | | |
|---|---|---|---|
| 2006/0292319 A1 | 12/2006 | Kurashina et al. | |
| 2015/0279242 A1* | 10/2015 | Parks | G09F 3/02 |
| | | | 428/41.7 |

FOREIGN PATENT DOCUMENTS

| | | | | |
|---|---|---|---|---|
| EP | 0656614 | | 6/1995 | |
| EP | 0917124 | | 5/1999 | |
| EP | 1065644 | A2 | 6/2000 | |
| EP | 2374118 | | 9/2015 | |
| JP | 2001088358 | A * | 4/2001 | |
| WO | WO2010015666 | | 2/2010 | |
| WO | WO-2010015666 | A1 * | 2/2010 | ............ B41J 15/044 |
| WO | WO2018134292 | | 7/2018 | |

OTHER PUBLICATIONS

PCT International Preliminary Report on Patentability for corresponding PCT International Application No. PCT/EP201/080880 dated Nov. 11, 2019, 7 pages.
Chinese Office Action for corresponding Chinese patent application No. 201980074439.X dated Jun. 27, 2022, 9 pages.

* cited by examiner

LABELLING MATERIAL

This Application claims priority to PCT Application No. PCT/EP2019/080880, filed Nov. 11, 2019, which claims priority to Belgian Patent Application Serial No. BE2018/ 5798, filed Nov. 13, 2018, the contents of each of which is incorporated herein by reference.

The present invention relates to a labeling material comprising a labeling region which is designed to be printed using a printing device and/or for handwritten labeling, comprising a carrier layer which is at least partially transparent and can be folded over onto the labeling region to cover or seal the labeling region and can be bonded thereto in portions or over the entire surface, and comprising one or more adhesive regions, such as an adhesive layer, adhesive dots, adhesive strips or the like, which are designed to bond the at least partially transparent carrier layer to the labeling region in portions or over the entire surface.

Printable labeling materials are used to identify objects in a simple manner. In particular for the identification of electrical installations, the labeling must be clearly recognizable even after a long period of time and must be reliably attached to the object. If, for example, the labeling material of one or more systems, switch cabinets, terminals, cables or the like should become loose or illegible due to environmental influences, time-consuming reassignment based on the installation plans may be necessary or the maintenance of a device may become more difficult.

EP 2 374 118 B1 describes a labeling material having a transparent protective layer that can be placed over a printing region. The labeling material is intended to be wrapped around a round cable by means of its adhesive layer, the printing region having adhesive applied thereover by an overlapping portion of transparent material when it is fully attached to a round cable. The labeling material according to EP 2 374 118 B1 is not suitable for being installed as labeling material that is to be applied so as to be planar or flat.

Against this background, the technical problem addressed by the invention is to provide a labeling material that can be produced simply and cost-effectively and can be applied so as to be planar or flat under a simultaneously protective, transparent covering of the printing region.

The above-described technical problem is solved by labeling material according to claim 1. Other embodiments are found in the dependent claims and the following description.

The invention relates to a labeling material comprising a labeling region which is designed to be printed using a printing device and/or for handwritten labeling, comprising a carrier layer which is at least partially transparent and can be folded over onto the labeling region to cover or seal the labeling region and can be bonded thereto in portions or over the entire surface, comprising one or more adhesive regions, such as an adhesive layer, adhesive dots, adhesive strips or the like, which are designed to bond the at least partially transparent carrier layer to the labeling region in portions or over the entire surface. The adhesive region and the labeling region are arranged on the same side of the at least partially transparent carrier layer.

Because the adhesive region and the labeling region are arranged on the same side of the at least partially transparent carrier layer, a labeling material can be provided simply and cost-effectively which can be applied in a two-dimensional manner, in particular so as to be flat or planar, under a simultaneously protective, transparent covering of the labeling region, by the carrier layer being folded onto the labeling region by means of an at least partially transparent region.

Partial bonding or bonding in portions can be achieved, for example, by adhesive only being provided at the edge or at certain points. Bonding over the entire surface can be achieved, for example, by an uninterrupted, continuous adhesive layer. In this way, a seal for protecting the labeling region can be obtained.

In this case, it may be provided that the carrier layer is folded substantially in the center, when viewed in a section transverse to the longitudinal extension.

In particular, it may be provided that said layer is folded over by bringing longitudinal edges of the carrier layer closer to one another or so as to lie on top of one another, the longitudinal edges being arranged in particular in a common planar plane after being folded over.

It may be provided that the carrier layer has a region which forms the labeling region, the carrier layer being printable directly by a printing device, such as an inkjet printer, a thermal transfer printer, a laser printer or the like.

Likewise, the region of the carrier layer that forms the labeling region can be designed for handwritten labeling.

Alternatively or additionally, an inlay that is labeled or to be labeled or is printed can be provided, which can be placed in the printing region and bordered by folding over the carrier layer.

Sealing takes place in particular when the labeling region is in particular printed, labeled or provided with an inlay.

It may be provided that the labeling region and the adhesive layer are adjacent to one another and adjoin one another in an unfolded state, in which the adhesive layer is not bonded to the labeling region.

Alternatively or additionally, it may be provided that the labeling region, when viewed in a cross section, has a height which corresponds to a height of a flap portion which can be folded over onto the labeling region. The flap portion may be designed to cover the labeling region over a large surface, in particular to cover the labeling region over the entire surface.

According to an alternative embodiment, it may be provided that the labeling region is formed by a printing layer which is applied to the carrier layer. The printing layer can be printed by a printing device, such as an inkjet printer, a thermal transfer printer, a laser printer or the like.

The printing layer can be adhesively bonded to the carrier layer, an adhesive bond which cannot be detached without being destroyed in particular being formed between the printing layer and the adhesive layer.

The printing layer may be integrally bonded to the carrier layer, in particular welded thereto.

It may be provided that the printing layer is a single-layer film. The printing layer can thus be provided in a simple and cost-effective manner.

Alternatively, the printing layer may be a multi-layer film. In this case, for example, a first layer can be designed for printing with an inkjet or thermal transfer printer, and a second layer can be designed to establish a connection to the carrier layer.

The printing layer may be a coating or lacquer that is applied to the carrier layer.

The printing layer may be formed in portions or over the entire surface of the carrier layer.

An intermediate layer, in particular in the form of an adhesion promoter, may be provided between the printing layer, which can be provided in the form of a film and/or coating, and the carrier layer.

According to another embodiment of the labeling material, it is provided that the at least partially transparent carrier layer is a single-layer film. The carrier layer can thus be provided in a simple and cost-effective manner.

Alternatively, the carrier layer may be a multi-layer film. For example, a first layer of the carrier layer may have a greater thickness and/or a higher rigidity than a second layer of the carrier layer in order to stiffen the carrier layer for a printing process. Alternatively or additionally, for example, one layer of the carrier layer may be formed as a transparent layer, and another layer may be designed to establish a connection to the printing layer.

According to another embodiment of the labeling material, it is provided that the carrier layer is made of a transparent material in its entirety. The carrier layer can thus be provided in a simple and cost-effective manner. In particular, the carrier layer may be a single layer which consists of a transparent material.

When a "transparent material" is referred to in the present case, this means that the material is translucent such that characters or symbols in the labeling region are still visible in the printed state after being covered with the carrier material.

Another embodiment of the labeling material is characterized by a cover sheet, such as a peel-off film or the like, the adhesive region, which is designed for bonding the at least partially transparent carrier layer to the labeling region, being covered with the cover sheet, and it being possible for the cover sheet to be removed in order to expose the adhesive region.

The cover sheet therefore enables the adhesive region to be covered in a simple manner for transport, storage and a printing process. After the cover sheet has been removed, the adhesive region forms a bonding region, in particular a bonding surface, to which the labeling region permanently adheres in the folded state of the labeling material. The adhesive region is also transparent in the sense that characters or symbols in the labeling region are still visible in the labeled state after bonding.

According to another embodiment of the labeling material, the cover sheet has a removal aid, such as a tab, a slot or the like, which can in particular be arranged at a distance from the carrier layer at least in portions. The removal aid enables a user to easily peel or detach the cover sheet from the adhesive region.

In order to provide a self-adhesive labeling material that can be attached to an object to be labeled without additional attachment means, another embodiment of the labeling material is provided which is characterized by an additional adhesive region, such as an adhesive layer, adhesive dots, adhesive strips or the like, for attaching the labeling material to an object to be marked, the adhesive region being arranged on a side of the carrier layer facing away from the labeling region. Thus, a further additional adhesive region may be provided which acts as an attachment means and is spaced apart from the adhesive region which is designed for bonding the at least partially transparent carrier layer to the labeling region.

In particular, the adhesive region, which is designed for bonding the at least partially transparent carrier layer to the labeling region, and the additional adhesive region, which acts as an attachment means, are spaced apart from one another at least by the thickness or wall thickness of the carrier layer in both the folded and unfolded state of the labeling material.

The additional adhesive region, when viewed in a cross section, may be arranged at the level of the labeling region.

The additional adhesive region, when viewed in a cross section, may be arranged at the level of a flap portion in an unfolded state. This arrangement allows the labeling region to be labeled in a mirrored manner.

In order to protect the additional adhesive region, which acts as an attachment means, during a labeling or printing process as well as during storage and transport and to prevent contamination, according to another embodiment of the labeling material, the additional adhesive region is covered by a cover sheet, which can be removed in order to expose the additional adhesive region. The cover sheet can also serve to stabilize or stiffen the labeling material for a printing process. After the cover sheet has been removed, the additional adhesive region forms a bonding region, in particular a bonding surface, by means of which the labeling material adheres to an object to be labeled in the fully assembled state. An object to be labeled may be, for example, a machine such as a production machine, a testing machine, a measuring machine or the like.

The cover sheet may be designed to be single-layered or multi-layered.

The cover sheet may comprise plastics material and/or cardboard or paper or may be made of plastics material or cardboard or paper. The cover sheet may be a support layer. The cover sheet is in particular removable such that the additional adhesive layer remains substantially completely on the labeling material, in particular the carrier layer.

Another embodiment of the labeling material is characterized in that the carrier layer has a flap portion which can be folded over onto and bonded to the labeling region in order to cover the labeling region, the adhesive region, which is designed for bonding the at least partially transparent carrier layer to the labeling region in the printed state, being provided on the flap portion, and the flap portion not having an adhesive region on a side of the carrier layer facing away from the adhesive region, in particular being free of adhesive, and in that the carrier layer has a labeling portion, which, when viewed in a height extension of the labeling material, is adjacent to and adjoins the flap region, the labeling region being provided on the labeling portion, the additional adhesive region being arranged on a side of the labeling portion facing away from the labeling region, and the additional adhesive region and the region of the flap portion which does not have an adhesive region, in particular is free of adhesive, being adjacent to one another and adjoining one another. In this way, in a simple and cost-effective manner, a printable labeling material can be provided which is self-adhesive and also has a protected labeling region in the folded state.

In order to configure the labeling material to be detectable in an automated manner, e.g. for applications in the food industry, it may be provided that the labeling material has a metal component, such as one or more metal layers, metal particles, metal threads or the like. The one or more metal components may be incorporated into a layer of the labeling material or received between two layers of the labeling material. The one or more metal components may be placed on a layer of the labeling material, so as to be connected and/or bonded in a form-fitting manner. The metal component may have an RFID tag.

Another embodiment of the labeling material is characterized by a detachable adhesive strip, which fixes longitudinal edges of the carrier layer in a folded basic state of the carrier layer, the carrier layer being in particular folded in the center in the folded basic state, when viewed in cross section. In this way, in particular, the labeling material can be reliably printed.

The labeling material may comprise one or more plastics materials or consist of one or more plastics materials.

The labeling material may be provided rolled up on a roll.

The carrier layer may be a transparent PET film, in particular having a thickness of approx. 50 µm.

The adhesive region may be an acrylic layer, in particular having a thickness of approx. 20 µm.

The printing layer may, for example, be a PET layer suitable for thermal transfer printing, in particular having a thickness of approx. 50 µm.

The additional adhesive region may be an acrylic layer, in particular having a thickness of approx. 20 µm.

The cover sheet of the adhesive region may be an HDPE layer, the abbreviation "HDPE" standing for "high-density polyethylene."

The labeling material may have a predetermined folding point or fold-over aid or folding aid, which is provided in particular as a preformed region, a punched-out region, a tapering region, a pre-folded region or a locally weakened region, in particular a perforation, between the flap portion and the labeling portion. This therefore makes it easier for a user to fold over the material, such that a defined fold line is formed and it is made possible to reliably cover or seal the labeling portion.

The predetermined folding point or fold-over aid or folding aid may extend in a straight line and in particular may be oriented transversely to a height extension, transversely to a thickness extension and along a longitudinal extension of the labeling material. In particular, the predetermined folding point or fold-over aid extends along the entire longitudinal extension.

The predetermined folding point or fold-over aid may be formed as a film hinge.

The invention is described in greater detail in the following with reference to drawings showing embodiments, in which, schematically:

FIG. 1 shows a labeling material 2 comprising a labeling region 4 which is designed to be printed using a printing device.

Figure 1:
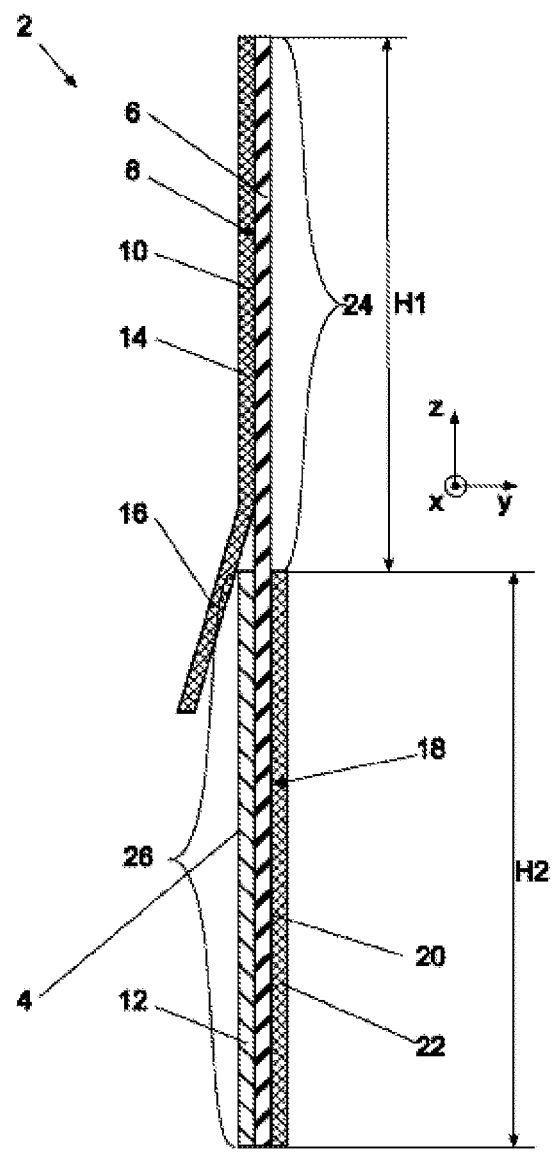
FIG. 1 shows a labeling material according to the invention.

The labeling material 2 has a carrier layer 6, which is at least partially transparent and can be folded over onto and bonded to the labeling region 4 to cover the labeling region 4 in the printed state.

On a first side 8 of the carrier layer 6, a first adhesive region is formed in the form of an adhesive layer 10, which is designed for bonding the carrier layer 6 to the labeling region 4. The adhesive layer 10 and the labeling region 4 are arranged on the same side 8 of the carrier layer 6.

For improved understanding of the following configurations, the coordinate system shown in FIG. 1 is introduced, the x axis being oriented in parallel with a longitudinal extension of the labeling material 2, the y axis denoting a thickness or wall thickness direction of the labeling material 2, in which a thickness or a wall thickness of the labeling material 2 or individual layers is determined, and the z axis defining a height extension of the labeling material, in which a height of individual portions of the labeling material 2 or of the labeling material 2 is measured as a whole.

In the present case, the labeling region 4 is formed by a printing layer 12 which is applied to the carrier layer 6 on its first side 8. In the present case, the printing layer 12 is a single-layer film, which is designed for labeling by means of a thermal transfer printer.

In the present case, the carrier layer 6 consists of a transparent, single-layer film 6. In the present case, the carrier layer 6 is made of a transparent plastics material.

A cover sheet in the form of a peel-off film 14 is attached to the first side 8 of the carrier layer 6. The adhesive layer 10 is covered by means of the peel-off film 14, the peel-off film 14 being peelable or detachable in order to expose the adhesive layer 10. The peel-off film 14 can therefore be peeled off from the adhesive layer 10 such that the adhesive layer 10 remains substantially completely adhered to the first side 8 of the carrier layer 6.

The peel-off film 14 has a removal aid in the form of a tab 16, which is arranged at a distance from the carrier layer 6.

An additional adhesive region in the form of an additional adhesive layer 20 is arranged on a second side 18 of the carrier layer 6 facing away from the first side 8 of the carrier layer 6. The adhesive layer 20 is designed to attach the labeling material 2 to an object to be marked. Therefore, the adhesive layer 20 is arranged on the side 18 of the carrier layer 6 facing away from the labeling region 4.

The additional adhesive layer 20 is covered by a cover sheet in the form of a support layer 22, which can be detached or peeled off in order to expose the additional adhesive layer 20. The support layer 22 can be peeled off from the adhesive layer 20 such that the adhesive layer 20 remains substantially completely on the second side 18 of the carrier material 16.

The carrier layer 6 has a flap portion 24 which can be folded over onto the labeling region 4 and bonded thereto by means of the adhesive layer 10 in order to cover the labeling region 4 in the printed state. The flap portion 24 extends in the height direction along the height H1.

The adhesive layer 10 is provided on the flap portion 24, the flap portion 24 not having an adhesive layer or being free of adhesive on the side 18 of the carrier layer 6 facing away from the adhesive layer 10.

The carrier layer 6 also has a printing portion 26 which, when viewed in a height extension of the labeling material 2 along the z axis, is adjacent to and adjoins the flap region 24.

The labeling region 4 is provided on the printing portion 26 of the carrier layer 6. The additional adhesive layer 20 is arranged on the side 18 of the printing portion 26 facing away from the labeling region 4. The additional adhesive layer 20 and the region of the flap portion 24 which does not have an adhesive layer are adjacent to one another and adjoin one another on the side 18.

The printing portion 26 extends in the height direction z along the height H2. The total height of the labeling material 2 therefore corresponds to H1+H2 in the unfolded state.

According to further embodiments of the labeling material, it may be provided that the carrier film 6 itself can be printed in the labeling region 26, such that no separate printing layer 12 is required on the carrier layer 6.

The labeling material 2 has a metal component (not shown) which is designed for the automated detection of the labeling material, in particular for the food industry. It is clear that, in accordance with alternative embodiments, such a metal component can be dispensed with.

Figure 2:
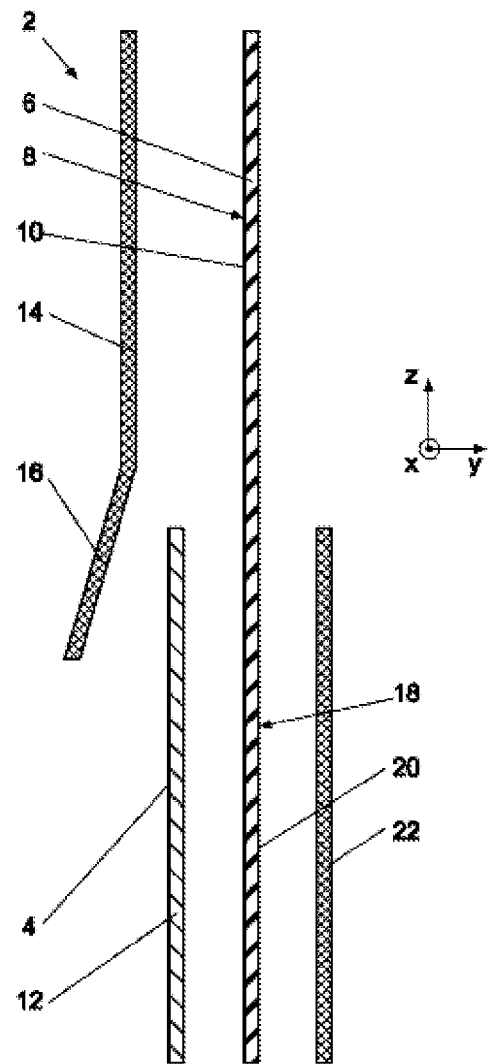
FIG. 2 is an exploded view of the labeling material from FIG. 1.

For improved understanding of the structure of the labeling material, the labeling material 2 is shown in FIG. 2 in an exploded view, in order to make the individual layers visible.

Figure 3:
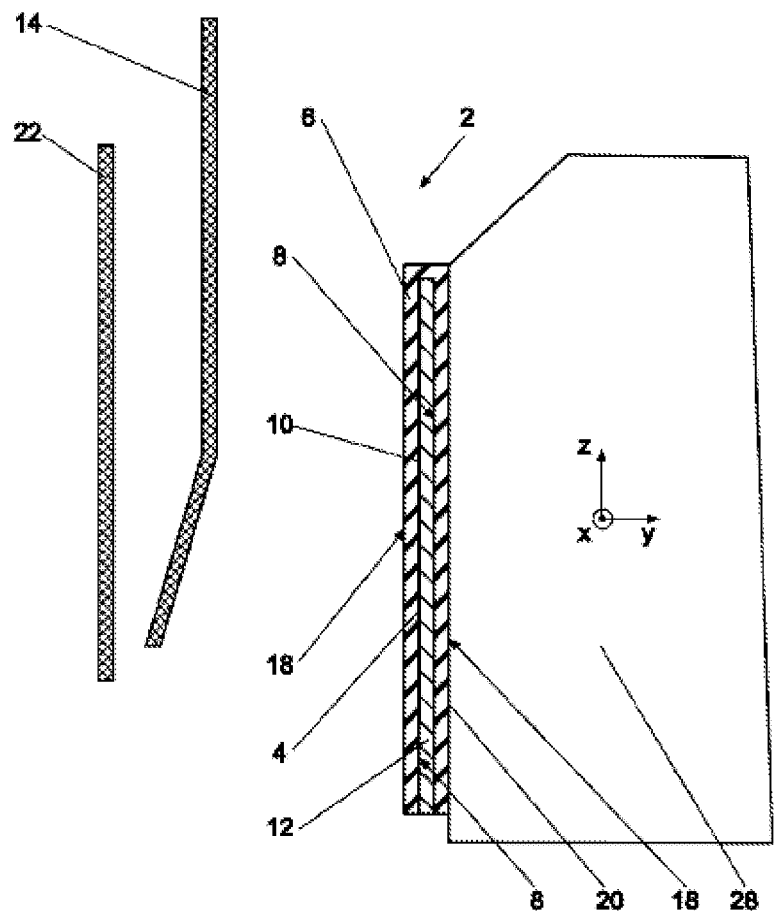
FIG. 3 shows the labeling material in a fully assembled state.

FIG. 3 shows the labeling material from FIGS. 1 and 2 in a fully assembled state. For this purpose, the labeling material 2 was first fed to a printing device in the state shown in FIG. 1, the labeling region 4 having been printed with symbols or characters. The peel-off film 14 was then removed (FIG. 3) and the flap region 24 was folded over onto the labeling region 4 in order to protect the labeling produced from environmental influences by means of the transparent covering formed by the carrier film 6.

In the next step, the support layer 22 was removed in order to expose the additional adhesive layer 20. Finally, the labeling material 2 was applied and bonded to the object 28 to be labeled by means of the additional adhesive layer 20. The peel-off film 14 and the support layer 22 according to FIG. 3 can be disposed of as waste and have no further function.

Figure 4A:
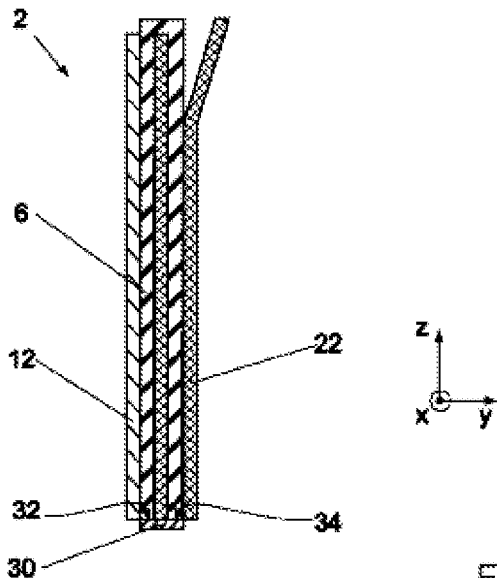
FIG. 4A shows the labeling material in a folded basic state.

A labeling material 2 can be provided in a folded basic state according to FIG. 4A, which is provided for feeding to a printing device.

The labeling material 2 is characterized by a detachable adhesive strip 30, which fixes or holds longitudinal edges 32, 34 of the carrier layer in the folded basic state of the carrier layer 6, the carrier layer 6 being in particular folded in the center in the folded basic state, when viewed in cross section. By means of the adhesive strip 30, the folded basic state can be reliably secured during printing.

After the printing, the adhesive strip 30 is removed, in particular without leaving any residue, such that the longitudinal edges are no longer fixed or held and the labeling material can be unfolded into the unfolded state shown in FIG. 1. The cover sheets can then be removed, the labeling region can be sealed and the labeling material can be bonded thereto (cf. FIG. 3).

Figure 4B:
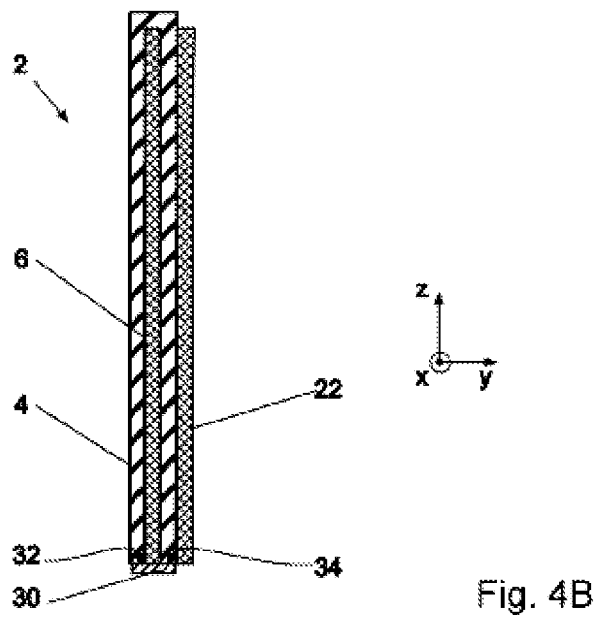
FIG. 4B shows an additional labeling material in a folded basic state.

FIG. 4B shows a variant of the labeling material, the labeling region 4 being part of the carrier layer 6 which can be printed or labeled directly.

Figure 5:
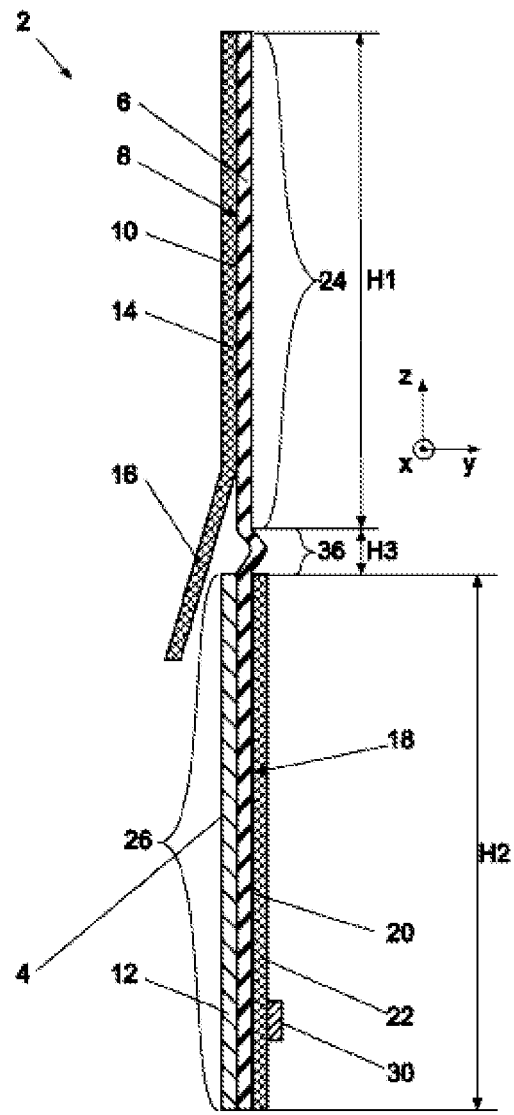
FIG. 5 shows an additional labeling material.

FIG. 5 shows another variant of the labeling material, an adhesive strip 30 being provided for holding a folded state comparable to FIGS. 4A and 4B. According to the variant in FIG. 5, the adhesive strip is used to hold the folded state in which the flap portion 24 adheres to the adhesive strip during printing. After printing, the labeling material 2 can be unfolded into the position shown in FIG. 5. The adhesive strip can then in particular be removed without leaving any residue.

Furthermore, the variant of the labeling material 2 described in FIG. 5 has a fold-over aid 36 having the height H3, which specifies a predetermined folding point for folding over the flap portion 24 onto the printing or labeling portion 26. The fold-over aid 36 may alternatively be configured as a punched-out region or local tapering region between the flap portion and the labeling portion. The fold-over aid 36 extends over the entire longitudinal extension of the labeling material 2, measured along the x axis. In the present case, the fold-over aid 36 forms a film hinge 36. According to alternative embodiments, a fold-over aid may be formed as a locally weakened region that extends in a straight line in the x direction, such as a perforation or the like, or as a pre-folded region.

LIST OF REFERENCE SIGNS

2 Labeling material
4 Labeling region
6 Carrier layer
8 First side
10 Adhesive layer
12 Printing layer
14 Peel-off film
16 Tab
18 Second side
20 Adhesive layer
22 Support layer
24 Flap portion
26 Printing portion/labeling portion
28 Object
30 Adhesive strip
32 Longitudinal edge
34 Longitudinal edge
36 Fold-over aid
H1 Height
H2 Height
z Height direction
x Longitudinal direction
y Thickness direction

The invention claimed is:

1. A labeling material, comprising:
a labeling region to be printed using a printing device and/or for handwritten labeling;
a carrier layer which is at least partially transparent and sized to be foldable over onto the labeling region to cover or seal the labeling region and bondable thereto in portions or over an entire surface of the labeling region;
an adhesive region including an adhesive layer, adhesive dots, or adhesive strips to bond the carrier layer to the labeling region in portions or over the entire surface of the labeling region; and
a detachable adhesive strip to fix longitudinal edges of the carrier layer,
wherein the adhesive region and the labeling region are arranged on a same side of the carrier layer.

2. The labeling material according to claim 1, wherein:
the labeling region and the adhesive region are adjacent and adjoin in an unfolded state, in which the adhesive region is not bonded to the labeling region, and/or
the labeling region, when viewed in a cross section, has a height which corresponds to a height of a flap portion which is foldable over onto the labeling region.

3. The labeling material according to claim 1, wherein the labeling region is formed by a printing layer which is applied to the carrier layer.

4. The labeling material according to claim 3, wherein:
the printing layer is a single-layer film, or
the printing layer is a multi-layer film, or
the printing layer is a coating.

5. The labeling material according to claim 1, wherein:
the carrier layer is a single-layer film, or
the carrier layer is a multi-layer film.

6. The labeling material according to claim 1, wherein the carrier layer is made entirely of a transparent material.

7. The labeling material according to claim 1, further comprising:
a cover sheet that is a peel-off film,
wherein the adhesive region is covered with the cover sheet, and
wherein the cover sheet is removable in order to expose the adhesive region.

8. The labeling material according to claim 7, wherein the cover sheet has a removal aid including a tab.

9. The labeling material according to claim 1, wherein:
the adhesive region is a first adhesive region, and
wherein the labeling material further comprises a second adhesive region for attaching the labeling material to an object to be marked, the second adhesive region being located on a side of the carrier layer facing away from the labeling region, such that the second adhesive region is arranged at a level of the labeling region or, in an unfolded state, at a level of a flap portion.

10. The labeling material according to claim 9, wherein the second adhesive region is covered by a cover sheet which is removable to expose the second adhesive region.

11. The labeling material according to claim 9, wherein:
the carrier layer has the flap portion which is foldable over onto and bonded to the labeling region in order to cover the labeling region,
the first adhesive region is provided on the flap portion, and
the flap portion does not have adhesive on a portion of the side of the carrier layer facing away from the first adhesive region, and wherein:
the carrier layer has a printing portion,
the printing portion, when viewed in a height extension of the labeling material, is adjacent to and adjoins the flap portion,
the labeling region is provided on the printing portion,
the second adhesive region is arranged on the side of the printing portion facing away from the labeling region, and
the second adhesive region and the flap portion which does not have an adhesive are adjacent and adjoin.

12. The labeling material according to claim 1, wherein the labeling material has a metal component including one or more metal layers, metal particles, or metal threads.

13. The labeling material according to claim 1, wherein the carrier layer is folded in a center in a folded basic state, when viewed in cross section.

* * * * *